United States Patent
Hsiao et al.

(10) Patent No.: US 9,246,396 B2
(45) Date of Patent: Jan. 26, 2016

(54) POWER SUPPLYING DEVICE WITH LOW STANDBY POWER CONSUMPTION

(71) Applicant: Chicony Power Technology Co., Ltd., New Taipei (TW)

(72) Inventors: Yung-Hung Hsiao, New Taipei (TW); Hao-Te Hsu, New Taipei (TW); Hung-Yi Wu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 240 days.

(21) Appl. No.: 13/960,408

(22) Filed: Aug. 6, 2013

(65) Prior Publication Data

US 2015/0043248 A1 Feb. 12, 2015

(51) Int. Cl.
*H02M 3/335* (2006.01)
*H02M 1/32* (2007.01)
*H02M 1/00* (2007.01)

(52) U.S. Cl.
CPC ...... *H02M 3/33523* (2013.01); *H02M 3/33553* (2013.01); *H02M 3/33569* (2013.01); *H02M 1/32* (2013.01); *H02M 2001/007* (2013.01); *H02M 2001/0032* (2013.01); *H02M 2001/0058* (2013.01)

(58) Field of Classification Search
CPC ... H02M 1/42; H02M 1/4208; H02M 1/4241; H02M 1/4258; H02M 3/335; H02M 3/33507; H02M 3/3353; H02M 3/33538; H02M 3/33546; H02M 3/33561
USPC .................... 363/20, 21.01, 21.02, 89, 95, 97
See application file for complete search history.

(56) References Cited

U.S. PATENT DOCUMENTS

| | | | | |
|---|---|---|---|---|
| 5,905,491 A * | 5/1999 | Kim | ............................... | 345/212 |
| 6,031,748 A * | 2/2000 | Hong | ............................... | 363/89 |
| 6,362,980 B1 * | 3/2002 | Ohashi et al. | .............. | 363/21.01 |
| 7,471,527 B2 * | 12/2008 | Chen | ............................... | 363/65 |
| 7,532,494 B2 * | 5/2009 | Louvel et al. | .................... | 363/89 |
| 7,856,566 B2 * | 12/2010 | Orr | ............................... | 713/320 |
| 7,885,085 B2 * | 2/2011 | Orr et al. | .................... | 363/21.02 |

(Continued)

FOREIGN PATENT DOCUMENTS

| | | |
|---|---|---|
| CN | 1925298 A | 3/2007 |
| TW | M361185 | 7/2009 |

(Continued)

*Primary Examiner* — Jeffrey Sterrett
(74) *Attorney, Agent, or Firm* — Muncy, Geissler, Olds & Lowe, P.C.

(57) ABSTRACT

A power supplying device is electrically connected to an alternating current (AC) power supplier and an electronic system. The power supplying device includes a rectifier, a power converter, a controller, a power manager, and a switch component. The power converter is electrically connected to the rectifier and includes a first electric power outputting terminal and a standby electric power outputting terminal. The standby electric power outputting terminal is electrically connected to the electronic system. The controller is electrically connected to the power converter. The power manager is electrically connected to the controller and the electronic system. The switch component is electrically connected to the first electric power outputting terminal, the power manager, and the electronic system. The switch component conducts or cuts-off an electric power outputted form the first electric power outputting terminal and transmitting to the electronic system according to controls of the power manager.

18 Claims, 9 Drawing Sheets

(56) References Cited

U.S. PATENT DOCUMENTS

| | | | |
|---|---|---|---|
| 8,194,419 B2* | 6/2012 | Ryu et al. | 363/21.04 |
| 8,247,922 B2* | 8/2012 | Ger et al. | 307/17 |
| 2008/0218503 A1* | 9/2008 | Lee | 345/211 |
| 2009/0316455 A1* | 12/2009 | Kim et al. | 363/89 |
| 2012/0147631 A1* | 6/2012 | Nate | 363/21.15 |
| 2012/0294046 A1* | 11/2012 | Nate et al. | 363/21.01 |
| 2013/0128623 A1* | 5/2013 | Hosotani | 363/21.01 |
| 2014/0368742 A1* | 12/2014 | Joo et al. | 348/730 |
| 2015/0003122 A1* | 1/2015 | Cui et al. | 363/21.18 |
| 2015/0043248 A1* | 2/2015 | Hsiao et al. | 363/21.02 |

FOREIGN PATENT DOCUMENTS

| | | |
|---|---|---|
| TW | M363021 U1 | 8/2009 |
| TW | M397546 | 2/2011 |
| TW | M398290 | 2/2011 |
| TW | 201113858 A | 4/2011 |
| TW | 201122794 A1 | 7/2011 |
| TW | I381621 B1 | 1/2013 |

* cited by examiner

POWER SUPPLYING DEVICE WITH LOW STANDBY POWER CONSUMPTION

BACKGROUND OF THE INVENTION

1. Field of the Invention

The present invention relates to a power supplying device, and in particular to a power supplying device with low standby power consumption.

2. Description of Related Art

Figure 1:
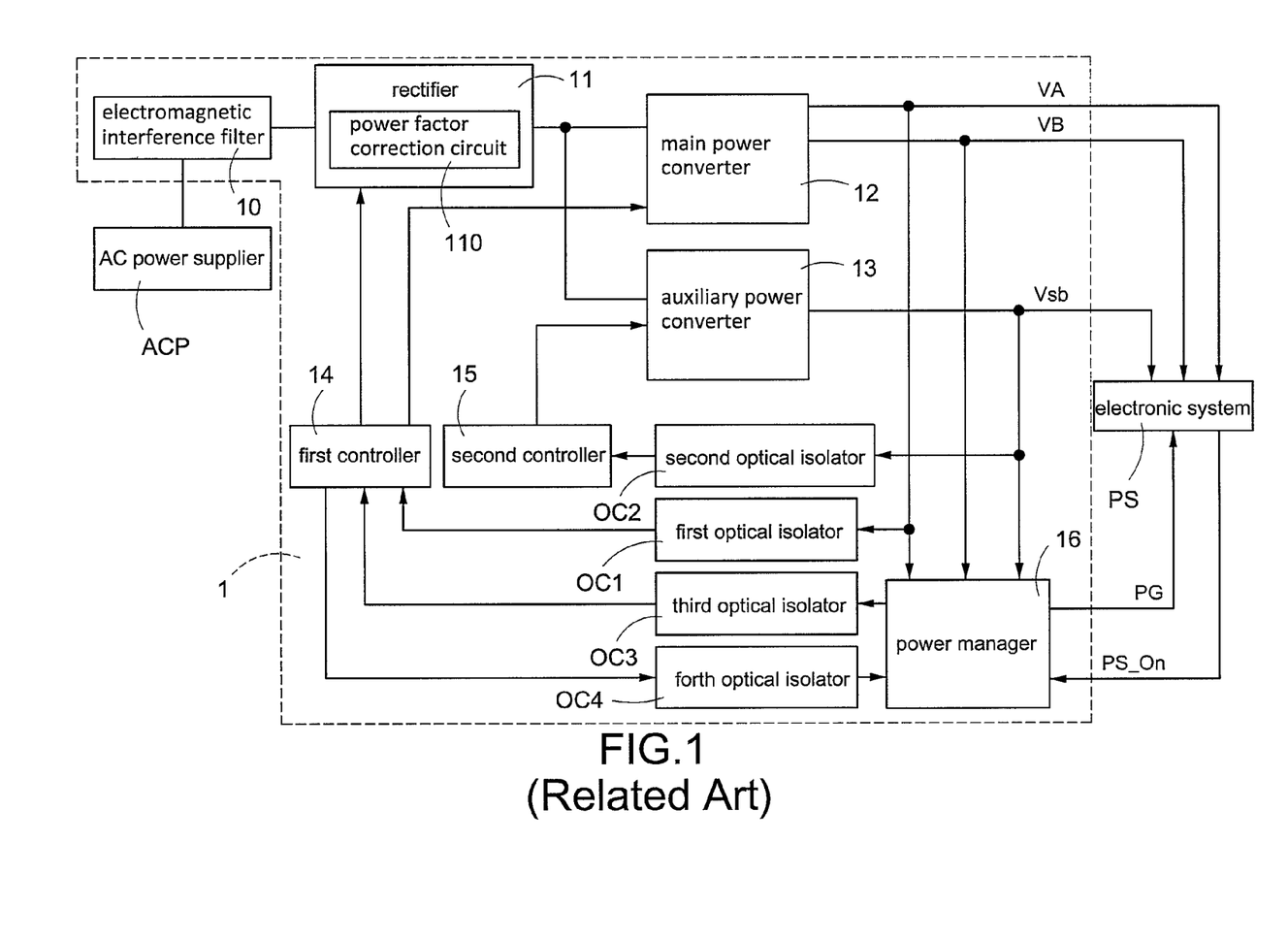
FIG. 1 is a circuit diagram of a conventional power device.

Reference is made to FIG. 1, which is a circuit block diagram of a conventional power supplying device. The power supplying device 1 is connected to an alternative current (AC) power supplier ACP and an electronic system PS. The power supplying device 1 receives an AC electric power provided by the AC power supplier ACP and then outputs a converted electric power with power conversion to the electronic system PS. The power supplying system 1 is provided to be operated in a normal mode or a standby mode. In the normal mode operation, the power supplying device 1 provides an electric power to operating electronic system PS, namely, the electronic system PS is operated in turn-on mode. On the contrary, in the standby mode, the electronic system PS is operated in turn-off mode.

The power supplying device 1 includes an electromagnetic interference filter 10, a rectifier 11, a main power converter 12, an auxiliary power converter 13, a first controller 14, a second controller 15, a power manager 16, a first optical isolator OC1, a second optical isolator OC2, a third optical isolator OC3, and a forth optical isolator OC4.

The electromagnetic interference filter 10 is electrically connected to the rectifier 11. The rectifier 11 is electrically connected to the main power converter 12 and the auxiliary power converter 12. The first controller 14 is electrically connected to the rectifier 11 and the main power converter 12. The second controller 15 is electrically connected to the auxiliary power converter 13. The power manager 16 is electrically connected to the main power converter 12 and the auxiliary power converter 13.

The first optical isolator OC1 is electrically connected to a first electric power outputting terminal VA of the main power converter 12 and the first controller 14. The second optical isolator OC2 is electrically connected to a standby electric power outputting terminal Vsb of the auxiliary power converter 13 and the second controller 15. The third optical isolator OC3 and the forth optical isolator OC4 are electrically connected to the power manager 16 and the first controller 14, respectively. The first optical isolator OC1, the second optical isolator OC2, the third optical isolator OC3, and the forth optical isolator OC4 are respectively an optical coupler.

The power supplying device 1 receives AC electric power outputted by the AC power supplier ACP. The electromagnetic interference filter 10 receives the AC power source outputted from the AC power supplier ACP and filters electromagnetic interference of the AC power source. The rectifier 11 is used for converting the AC electric power outputted form the electromagnetic interference filter 10 into a direct current (DC) electric power. The rectifier 11 includes a power factor correction circuit 110 for decrease inputting current.

The main power converter 12 receives the DC electric power outputted form the rectifier 11 and is controlled by the controller for modulating the levels of the electric powers outputted form the first electric power outputting terminal VA and the second electric power outputting terminal VB. The main power converter 12 is a DC to DC power converter such as an LLC resonant power converter, a dual forward power converter or a single forward power converter. The auxiliary power converter 13 receives the DC electric power outputted form the rectifier 11 and is controlled by the second controller 15 for modulating the level of outputting electric power. The auxiliary power converter 13 is, for example, a flyback power converter.

The main power converter 12 outputs electric powers with power conversion from the first electric power outputting terminal VA and the second electric power outputting terminal VB when in the normal operation, however in the standby operation, the main power converter 12 has no power conversion and does not output electric powers (namely the first electric power outputting terminal VA and the second electric power outputting terminal VB do not output electric powers). The auxiliary power converter 13 not only outputs electric power with power conversion from the standby electric power outputting terminal Vsb in the normal operation, but in the standby operation. In standby operation, the power supplying device 1 stops the main power converter 12 outputting electric power, which can effectively reduce power consumption in standby operation and achieve power reservation.

However, the volume of the power supplying device 1 simultaneously including the main power converter 12 and the auxiliary power converter 13 is large, and in normal operation, the main power converter 12 and the auxiliary converter 13 are respectively proceeded power conversion, and the power consumption of the power supplying device 1 in normal operation is then increased.

SUMMARY OF THE INVENTION

It is an object to provide a power supplying device with low standby power consumption with advantages of power consumption and miniaturization.

Accordingly, the power supplying device with low standby power consumption according to one aspect of the present invention is electrically connected to an alternative power (AC) supplier and an electronic system, the power supplying receiving an AC electric power outputted by the AC supplier and outputting a converted electric power with power conversion to the electronic system. The power supplying device comprises a rectifier, a power converter, a controller, a power manager, and a switch component. The rectifier comprises a power factor correction circuit, the rectifier used for converting the AC electric power into a direct current (DC) electric power, the power factor correction circuit correcting the rectified DC electric power for decreasing the inputting current. The power converter is electrically connected to the rectifier and comprises a first electric power outputting terminal and a standby electric power outputting terminal, the power converter receives the DC electric power decreasing the inputting current and outputted from the rectifier. The electronic system is electrically connected to the standby electric power outputting terminal. The controller is electrically connected to the power converter. The power manager is electrically connected to the controller and the electronic system. The switch component is electrically connected to the first electric power outputting terminal, the power manager, and the electronic system. The switch component conducts or cuts-off an electric power outputted from the first electric power outputting terminal according to controls of the power manager.

In an embodiment of the present invention, wherein the power converter comprises a second electric power outputting terminal electrically connected to the switch component, the switch component conducts or cut-off electric powers outputted from the first electric power outputting terminal and the second electrical power outputting terminal according to controls of the power manager.

In an embodiment of the present invention, the power supplying device further comprises a first isolating switch electrically connected to the second electric power outputting terminal, the standby electric power outputting terminal, and the controller, wherein the electric powers outputted from the second electric power outputting terminal and the standby electric power outputting terminal are transmitted to the controller via the first isolating switch.

In an embodiment of the present invention, the power supplying device further comprises a standby power converter and a DC to DC power converter. The standby power converter is electrically connected to the standby electric power outputting terminal of the power converter. The DC to DC power converter is electrically connected to the first electric power outputting terminal. The DC to DC power converter comprises a second electric power outputting terminal and a third electric power outputting terminal, the second electric power outputting terminal and the third electric power outputting terminal are electrically connected to the switch component. The switch component conducts or cuts-off electric powers outputting from the first electric power outputting terminal, the second electric power outputting terminal, and the third electric power outputting terminal according to controls of the power manager.

In an embodiment of the present invention, the power supplying device further comprises a first isolating switch electrically connected to the first electric power outputting terminal and the controller, wherein the electric power outputted form the first electric power outputting terminal is transmitted to the controller via the first isolating switch.

In an embodiment of the present invention, the power supplying device further comprises a second isolating switch and a third isolating switch. The second isolating switch is electrically connected to the power manager and the controller, wherein a protecting signal outputted from the power manager is transmitted to the controller via the second isolating switch. The third isolating switch is electrically connected to the power manager and the controller, wherein a controlling signal outputted from the controller is transmitted to the power manager via the third isolating switch.

In an embodiment of the present invention, the power supplying device further comprises an electromagnetic interference filter electrically connected to the AC power supplier and the rectifier.

In an embodiment of the present invention, the power converter is a direct current (DC) to DC power converter.

In an embodiment of the present invention, the power converter is an LLC resonant power converter, a dual forward power converter or a single forward power converter.

Accordingly, the power supplying device according to another aspect of the present invention is electrically connected to an AC supplier and an electronic system, the power supplying receiving an AC electric power outputted by the AC supplier and outputting a converted electric power with power conversion to the electronic system. The power supplying device comprises a rectifier, a power converter, a DC to DC power converter, a controller, a power manager, and s switch component. The rectifier comprises a power factor correction circuit, the rectifier used for converting the AC electric power into a direct current (DC) electric power, the power factor correction circuit correcting the rectified DC electric power for decreasing the inputting current. The power converter is electrically connected to the rectifier and comprises a first electric power outputting terminal, the power converter receives the DC electric power decreasing the inputting current and outputted from the rectifier. The DC to DC power converter is electrically connected to the first electric power outputting terminal and comprises a second electric power outputting terminal, a third electric power outputting terminal, and a standby electric power outputting terminal, the standby electric power outputting terminal is electrically connected to the electronic system. The controller is electrically connected to the power converter. The power manager is electrically connected to the controller, the DC to DC power converter, and the electronic system. The switch component is electrically connected to the first electric power outputting terminal, the second electric power outputting terminal, the third electric power outputting terminal the power manager, and the electronic system. The switch component conducts or cuts-off electric powers outputted form the first electric power outputting terminal, the second electric power outputting terminal and the third electric power outputting terminal according to controls of the power manager.

In an embodiment of the present invention, the power supplying device further comprises a first isolating switch, a second isolating switch, and a third isolating switch. The first isolating switch is electrically connected to the first electric power outputting terminal and the controller, wherein the electric power outputted from the first electric power outputting terminal is transmitted to the controller via the first isolating switch. The second isolating switch is electrically connected to the power manager and the controller, wherein a protecting signal outputted form the power manager is transmitted to the controller via the second isolating switch. The third isolating switch is electrically connected to the power manager and the controller, wherein a controlling signal outputted form the controller is transmitted to the power manager.

In an embodiment of the present invention, the power supplying device further comprises an electromagnetic interference filter electrically connected to the AC power supplier and the rectifier.

In an embodiment of the present invention, the power converter is a DC to DC power converter.

In an embodiment of the present invention, the power converter is an LLC resonant power converter, a dual forward power converter or a single forward power converter.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 2:
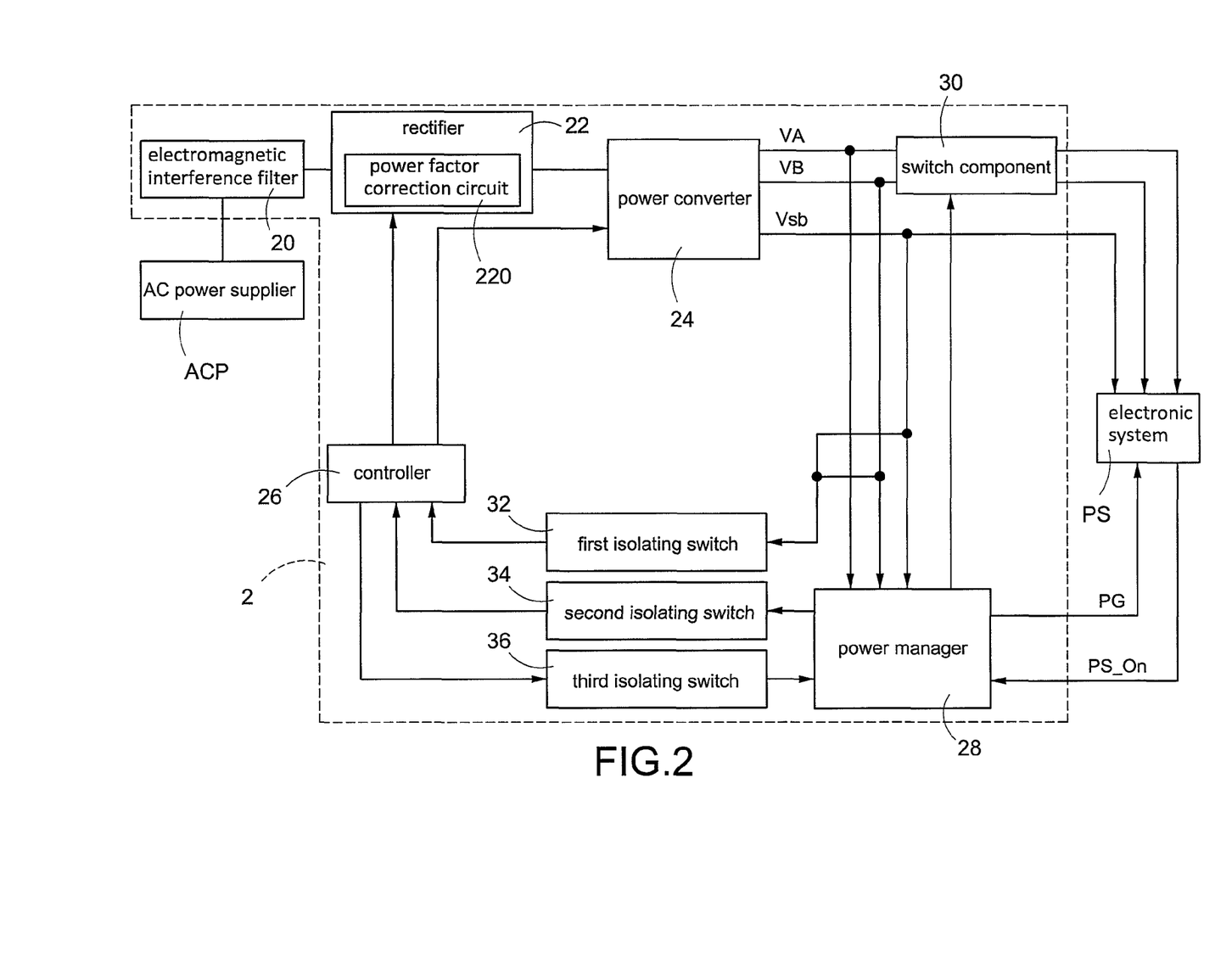
FIG. 2 is a circuit block diagram of a power supplying device according to a first embodiment of the present invention.

Reference is made to FIG. 2, which is a circuit block diagram of a power supplying device according to a first embodiment of the present invention. The power supplying device 2 is electrically connected to an alternative current (AC) power supplier ACP and an electronic system PS. The power supplying device 2 receives an AC power source outputted from the AC electric power supplier ACP and outputs a converted electric power with power conversion to the electronic system PS.

The power supplying device 2 includes an electromagnetic interference filter 20, a rectifier 22, a power converter 24, a controller 26, a power manager 28, and a switch component 30. The electromagnetic interference filter 20 is electrically connected to the AC power supplier ACP. The electromagnetic interference filter 20 receives the AC power source outputted from the AC power supplier ACP and filters electromagnetic interference of the AC power source.

The rectifier 22 is used for converting the AC electric power outputted form the electromagnetic interference filter 20 into a direct current (DC) electric power. The rectifier 22 includes a power factor correction circuit 220 for decreasing inputting current.

The power converter 24 is electrically connected to the rectifier 22 and the controller 26 and includes a standby electric power outputting terminal Vsb, a first electric power outputting terminal VA, and a second electric power outputting terminal VB. The power converter 24 receives the DC electric power, and is controlled by the controller 26 such that the voltage levels of electric powers outputted from the standby electric power outputting terminal Vsb, the first electric power outputting terminal VA, and the second electric power outputting terminal VB are modulated.

The power manager 28 is electrically connected to the power converter 24, the controller 26, and the electronic system PS. The power manager 28 transmits signals to the electronic system PS via a signal outputting terminal PG, and receives signals outputted from the electronic system PS via a signal inputting terminal PS_On.

The switch component 30 is electrically connected to the power manager 28, the first electric power outputting terminal VA, the second electric power outputting terminal VB, and the electronic system PS. The switch component 30 conducts or cuts-off electric powers outputted from the first electric power outputting terminal VA and the second electric power outputting terminal VB and transmitted to the electronic system PS.

Figure 3:
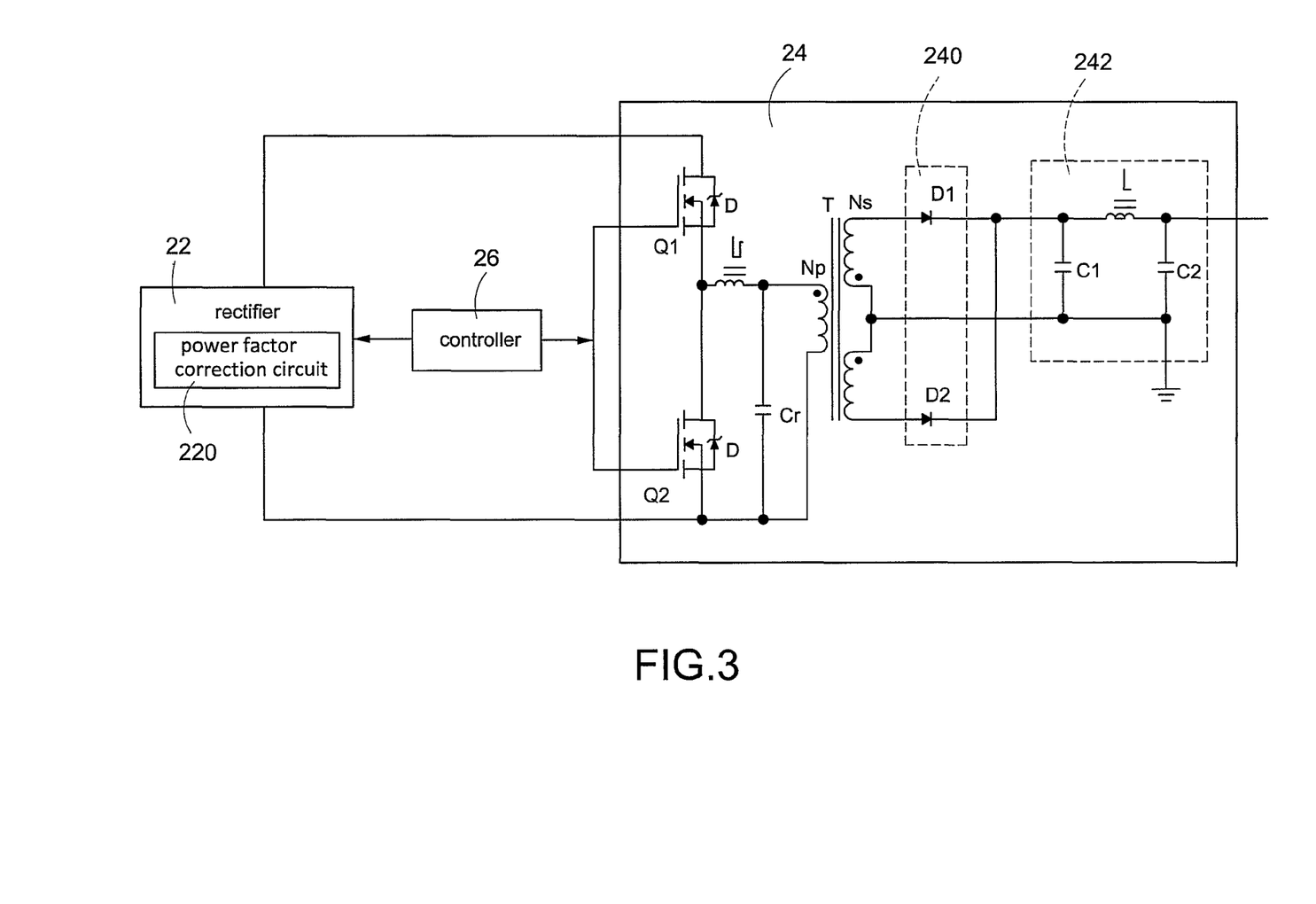
FIG. 3 is a circuit diagram of a power converter according to a first embodiment of the present invention.
Figure 4:
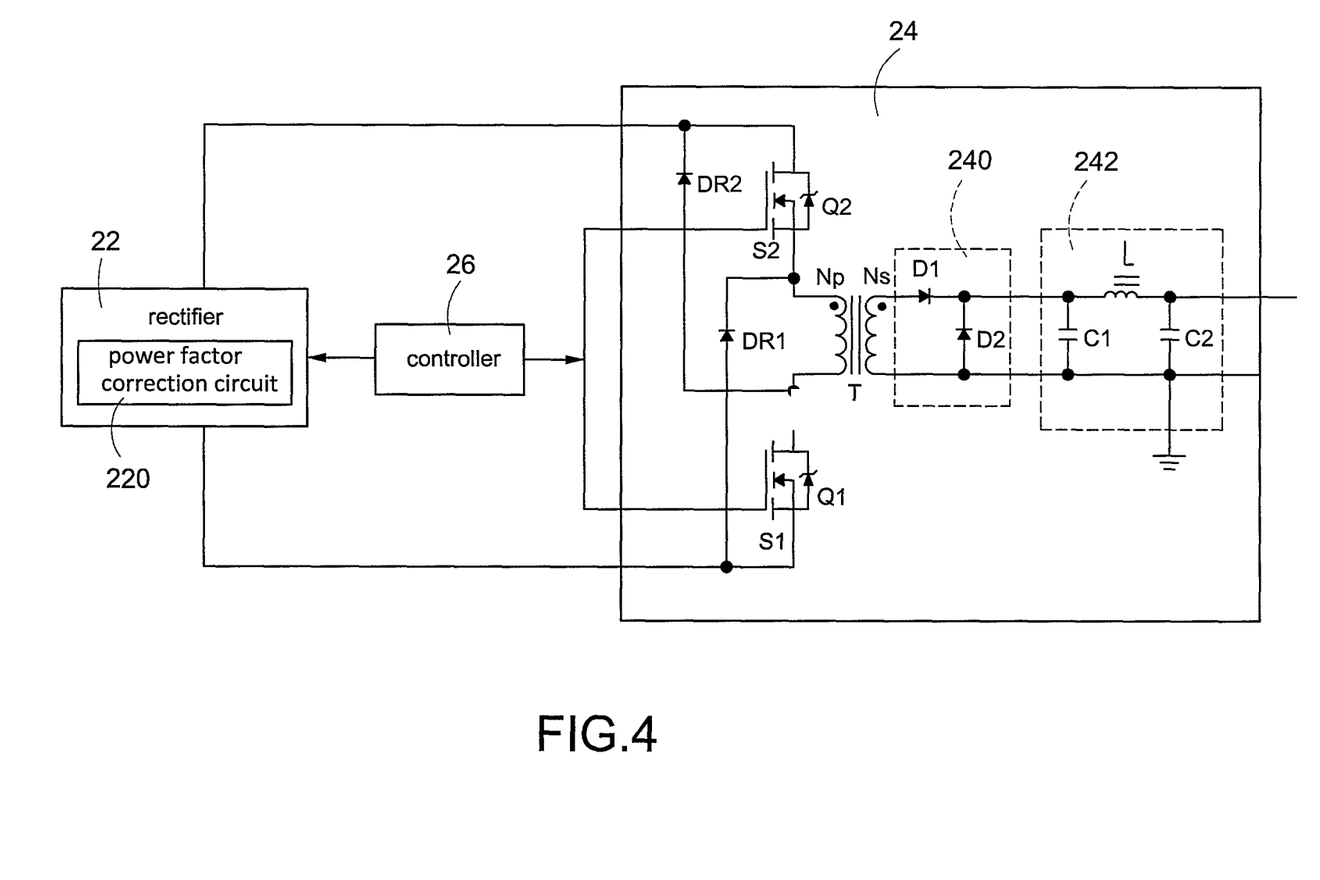
FIG. 4 is a circuit diagram of a power converter according to a second embodiment of the present invention.
Figure 5:
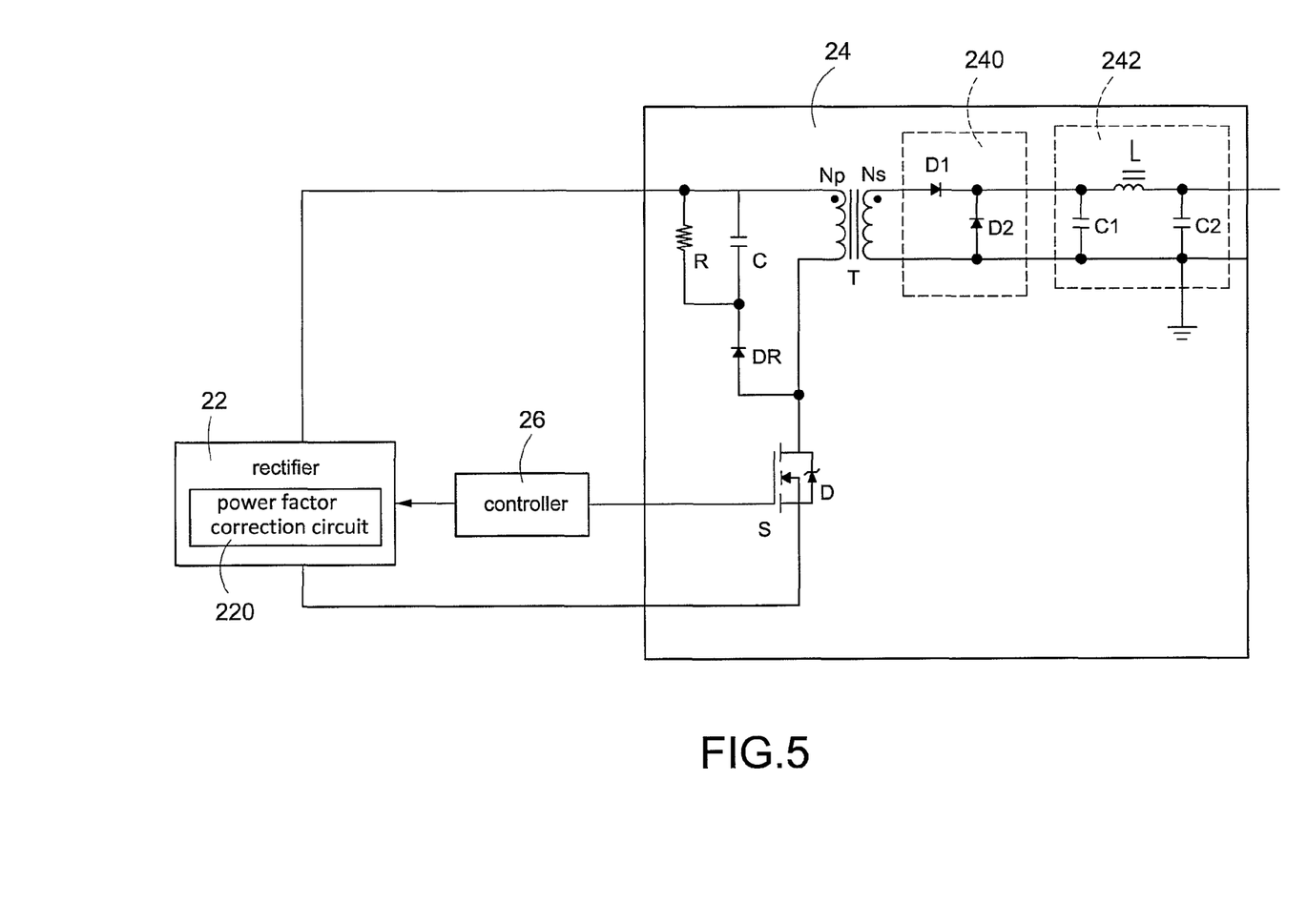
FIG. 5 is a circuit diagram of a power converter according to a third embodiment of the present invention

It should be noted that the power converter 24 is, for example, a DC to DC power converter, such as an LLC resonant power converter (as shown in FIG. 3), a dual forward power converter (as shown in FIG. 4) or a single forward power converter (as shown in FIG. 5).

Reference is made to FIG. 3, which is a circuit diagram of a power converter according to a first embodiment of the present invention. The power converter 24 shown in FIG. 3 is a LLC resonant power converter and includes two switches Q1 and Q2, a resonant inductor Lr, a resonant capacitor Cr, a transformer T, a rectifying circuit 240, and a filtering circuit 242.

The switches Q1 and Q2 are electrically connected to the rectifier 22 and the controller 26. The switches Q1 and Q2 receive signals provided by the controller 26 and then a square wave corresponding to on/off states of the switches Q1 and Q2 is generated. In this embodiment, the switches Q1 and Q2 are respectively metal-oxide-semiconductor field-effect transistor (MOSFET), and the gates of the switches Q1 and Q2 are electrically connected to the controller 26 such that signals outputted from the controller 26 drive the switches Q1 and Q2. A diode D is connected between the drain and the source of each switch Q1, Q2, however the diode D can be a parasitic diode of each switch Q1, Q2.

The resonant inductor Lr is electrically connected to the switches Q1 and Q2. In this embodiment, the resonant inductor Lr is connected between the source of the switch Q1 and the drain of the switch Q2 such that the resonant inductor Lr receives the square wave corresponding to on/off states of the switches Q1 and Q2. The resonant capacitor Cr is electrically connected to the resonant inductor Lr and a primary winding Np of the transformer T. The resonant capacitor Cr is not only used for blocking DC component of the square wave, but constructing a resonant tank with the resonant inductor Lr and the primary winding Np of the transformer T. In this embodiment, the transformer T is a center-tapped transformer.

The rectifying circuit 240 includes two rectifying diodes D1 and D2. The rectifying diodes D1 and D2 are respectively electrically connected to a secondary winding Ns of the transformer T such that a full-bridge rectifying circuit is formed to convert an AC electric power outputted form the transformer T into a DC electric power with high-frequency ripple component. The filtering circuit 242 is a CLC filtering circuit and includes a filtering inductor L and two filtering capacitors C1 and C2 connected to both end of the filtering inductor L. The filtering circuit 242 filters high-frequency ripple component of the DC electric power outputted from the diode D1 and D2 and outputs a stable DC electric power.

Reference is made to FIG. 4, which is a circuit diagram of a power converter according to a second embodiment of the present invention. The power converter 24 shown in FIG. 4 is a dual forward power converter and includes two active switches S1 and S2, two passive switches DR1 and DR2, a rectifying circuit 240, a filtering circuit 242, and a transformer T. The transformer T includes a primary winding Np and a secondary winding Ns.

The active switches S1 and S2 are electrically connected to the rectifier 22 and the controller 26. The active switches S1 and S2 receive the DC electric power outputted form rectifier 22 and are controlled by the controller 26 such that a square wave corresponding to on/off states of the switches Q1 and Q2 is generated. In this embodiment, the active switches are MOSFET, and the gate of the switches S1 and S1 are electrically connected to the controller 26. A diode D is connected between the drain and the source of each active switch S1, S2, however the diode D can be a parasitic diode of each active switch S1, S2.

One end of the passive switch DR1 is connected to the active switch S1, and the other end of the passive switch DR1 is connected to the first primary winding Np. One end of the passive switch DR2 is connected to the active switch S2, and the other end of the passive switch DR2 is connected to the secondary winding Ns. In this embodiment, the passive switches DR1 and DR2 are respectively a diode.

The rectifying circuit 240 is composed of two diodes D1 and D2 and electrically connected to the secondary winding Ns for converting an AC electric power outputted form the transformer T into a DC electric power with high-frequency ripple component. The filtering circuit 242 is electrically connected to the rectifying circuit 240 and preferably a CLC filtering circuit including a filtering inductor L and two filtering capacitors C1 and C2 connected to both end of the filtering inductor L. The filtering circuit 242 filters high-frequency ripple component of the DC electric power outputted from the diode D1 and D2 and outputs a stable DC electric power.

Reference is made to FIG. 5, which is a circuit diagram of power converter according to a third embodiment of the present invention. The power converter shown in FIG. 5 is a single forward power converter and includes an active switch S, a passive switch DR, a capacitor C, a resistor R, a transformer T, a rectifying circuit 240, and a filtering circuit 242.

The active switch S is electrically connected to the rectifier 22 and the controller 26. The active switches S receive the DC electric power outputted form rectifier 22 and are controlled by the controller 26 such that a square wave corresponding to on/off states of the switches Q1 and Q2 is generated. In this embodiment, the active switch S is a MOSFET, and the gate of the switch S is electrically connected to the controller 26. A diode D is connected between the drain and the source of the switch S, however the diode D can be a parasitic diode of the active switch S.

The rectifying circuit 240 is composed of two diodes D1 and D2 and electrically connected to the secondary winding Ns for converting an AC electric power outputted form the transformer T into a DC electric power with high-frequency ripple component. The filtering circuit 242 is electrically connected to the rectifying circuit 240 and preferably a CLC filtering circuit including a filtering inductor L and two filtering capacitors C1 and C2 connected to both end of the filtering inductor L. The filtering circuit 242 filters high-frequency ripple component of the DC electric power outputted from the diode D1 and D2 and outputs a stable DC electric power.

With refer again to FIG. 2, the power supplying device further includes a first isolating switch 32, a second isolating switch 34, and a third isolating switch 36. The first isolating switch 32, the second isolating switch 34, and the third isolating switch 36 are, for example, optical couples.

One end (signal emitting end) of the first isolating switch 32 is electrically connected to the standby electric power outputting terminal Vsb and the second electric power outputting terminal VB for sensing electric powers outputting therefrom. The other end (signal receiving end) of the first isolating switch is electrically connected to the controller 26 for isolated-transmitting signals corresponding to the electric powers to the controller 26.

One end (signal emitting end) of the second isolating switch 34 is electrically connected to the power manager 28, and the other end (signal receiving end) of the second isolating switch is electrically to the controller 26. When the electronic system PS or the power supplying device 2 operates in states of over voltage, over current or short, the power manager 28 emits a protecting signal with reference to over voltage, over current or short operation to the controller 26 via the second isolating switch 34, therefore the controller 26 drives the power converter stop power conversion.

One end (signal emitting end) of the third isolating switch 36 is electrically connected to the controller 26, and the other end (signal receiving end) of the third isolating switch 36 is electrically connected to the power manager 28. The power manager 28 receives a controlling signal emitted by the controller 26 via the third isolating switch 36 when electric power converter by the power converter 24 is exact, and then the power manager outputs an exact signal to the electronic system PS by the signal outputting terminal PG to notice that the electric power of the power supplying device 2 is exact.

Figure 6:
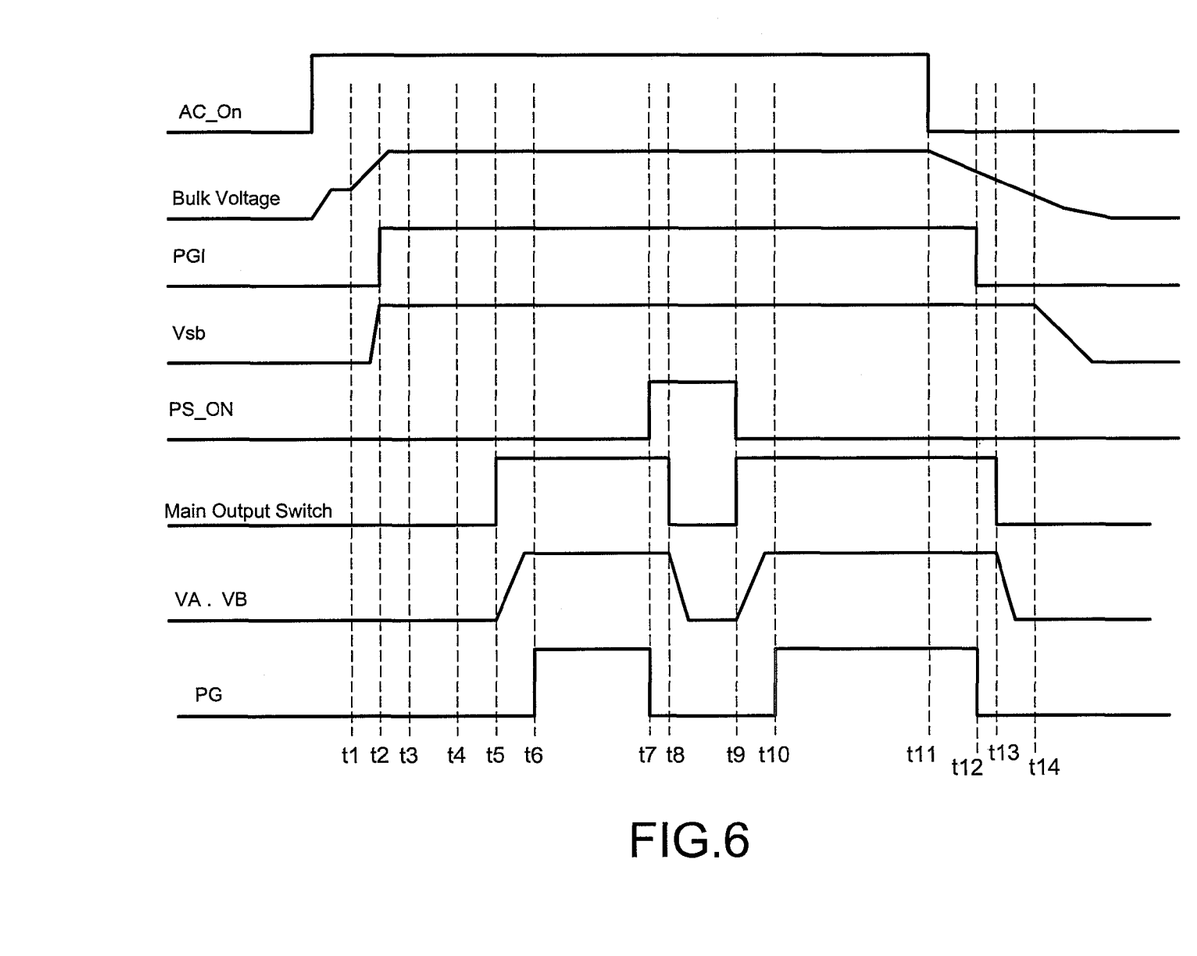
FIG. 6 is a timing diagram illustrating operations of the power supplying device shown in FIG. 2.

Reference is made to FIG. 6, which is a timing diagram illustrating operations of the power supplying device shown in FIG. 2. At time t1 to t7, the AC power supplier ACP is activated (AC_On is at a logic high level) and the electronic system PS is activated (PS_On is at a logic low level). Therefore, the switch component 30 closes and the standby electric power outputting terminal Vsb, the first electric power outputting terminal VA, and the second electric power outputting terminal VB of the power supplying device 30 respectively output electric power to the electronic system PS.

At time t7 to t8, the AC power supplier ACP is activated and the electronic system PS is inactivated (PS_On is at a logic low level), and therefore the switch component 30 opens so that only the standby electric power outputting terminal Vsb of the power supplying device 2 outputs electric power to the electronic system PS. However, the electric powers outputted form the first electric power outputting terminal VA and the second electric power outputting terminal VB do not transmit to the electronic system PS due to the switch component 30 opens.

At time t9 to t11, the AC power supplier ACP is activated and the electronic system PS becomes activated from inactivated (PS_On is turned into the logic high level from the logic low level), and therefore the switch component 30 closes and the standby electric power outputting terminal Vsb, the first electric power outputting terminal VA, and the second electric power outputting terminal VB respectively outputs electric power to the electronic system PS.

After time t11, the AC power supplier ACP is inactivated (AC_On at a logic low level) and the electronic system is activated. Therefore, when a voltage outputted from the power converter 24 is lower than a first predetermined voltage (at time t11 to t12), the signal outputting terminal PG of the power supplying device 2 outputs a warning signal to the electronic system PS to warn the electronic system that the outputted voltage is lower than the first predetermined voltage. When the voltage outputted from the power convert 24 is lower than a second predetermined voltage (at time t12 to t13), the switch component 30 opens, and the electric power outputted form the first electric power outputting terminal VA and the second electric power outputting terminal VB cannot transmit to the electronic system PS. When the voltage outputted form the power converter 24 is lower than a third predetermined voltage, the standby electric power outputting terminal stops outputting electric power to the electronic system PS. In particularly, the first predetermined voltage is larger than the second predetermined voltage, and the third predetermined voltage is lower than the second predetermined voltage.

Figure 7:
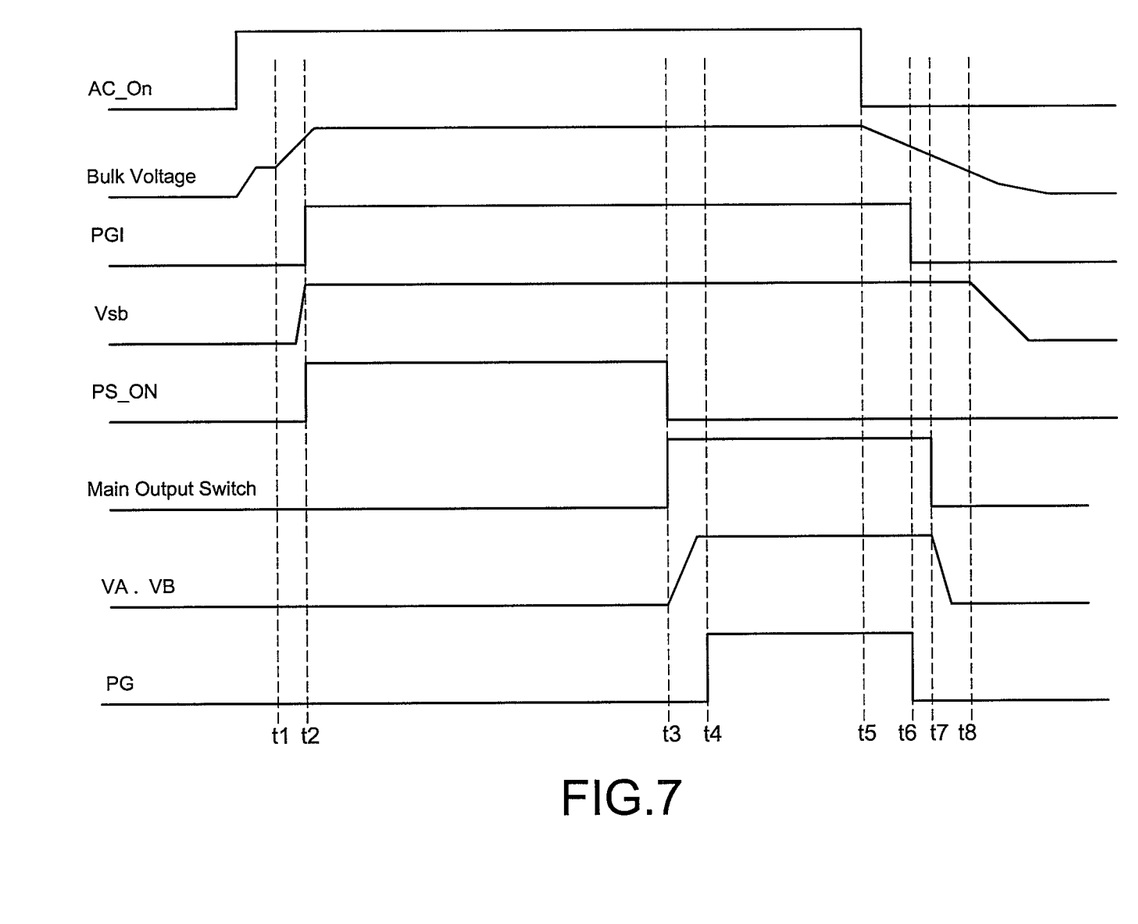
FIG. 7 is another timing diagram illustrating operations of the power supplying device shown in FIG. 2.

Reference is made to FIG. 7, which is another timing diagram illustrating operations of the power supplying device shown in FIG. 2. At time t1 to t2, the AC power supplier ACP is activated and the electronic system PS is activated, and therefore when the voltage outputted from the power converter 24 is larger than a forth predetermined voltage, the standby electric power outputting terminal Vsb outputs electric power to the electronic system PS.

At time t2 to t3, the AC power supplier ACP is activated and the electronic system is inactivated, therefore the switch component opens, and the standby electric power outputting terminal Vsb outputs electric power to the electronic system PS. However, the electric power outputted form the first electric power outputting terminal VA and the second electric power outputting terminal VB do not transmit to the electronic system PS due to the switch component opens, namely the power supplying device 2 is operated in standby mode.

Operation at time t3 to t5 shown in FIG. 7 is the same as the operation at time t9 to t11 shown in FIG. 6, and operations at time t5 to t8 shown in FIG. 7 is the same as the operations shown in FIG. 6, and not description in detail herein.

To sum up, compare to the conventional power supplying device 1, the power supplying device 2 according to the present invention without auxiliary power converter so that the volume and power consumption of the power supplying device 2 can be effectively reduced and the power supplying device 2 has advantage of low standby power consumption.

Figure 8:
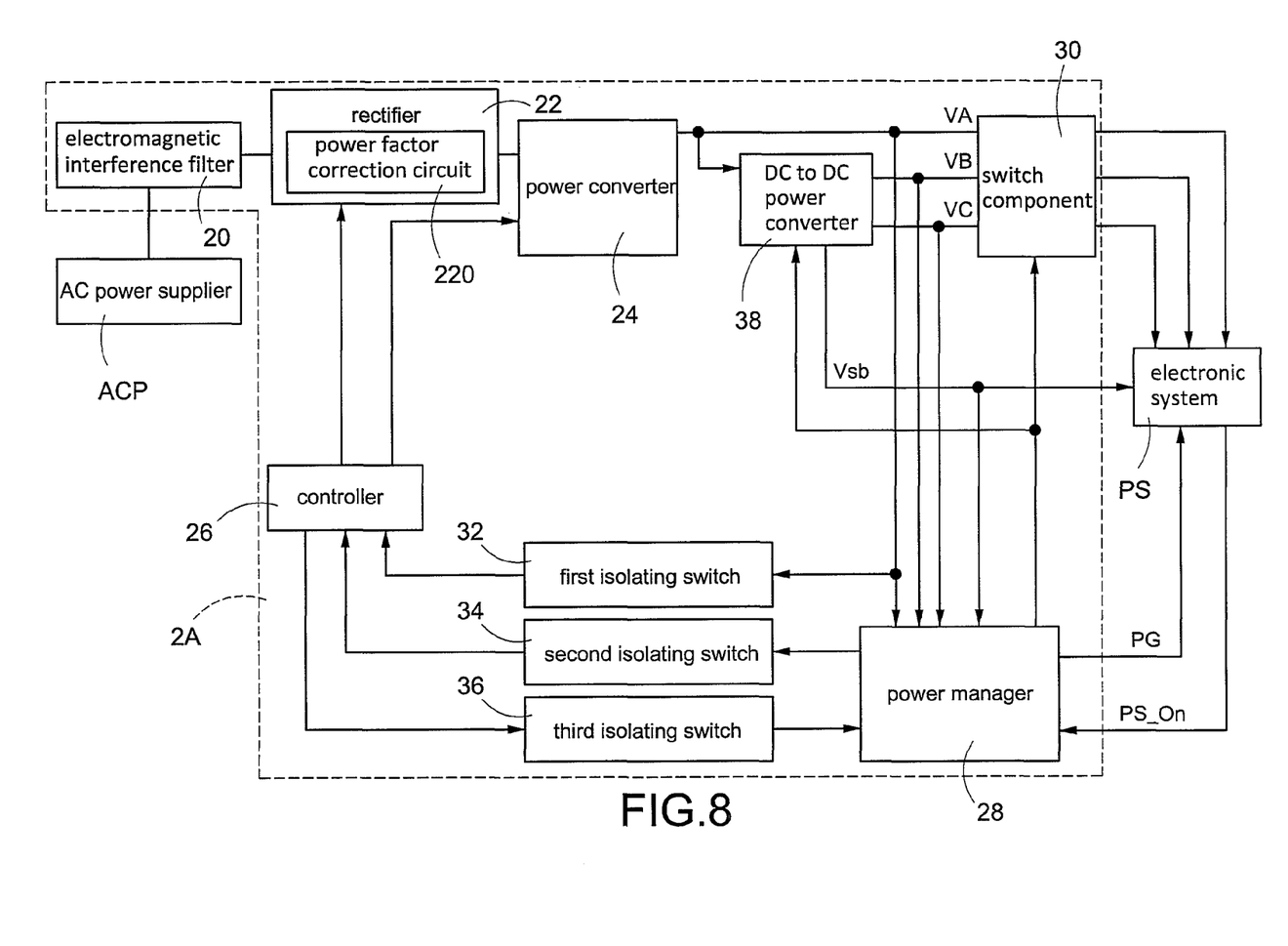
FIG. 8 is a circuit block diagram of a power supplying device according to a second embodiment of the present invention.

Reference is made to FIG. 8, which is a circuit block diagram of a power supplying device according to a second embodiment of the present invention. The power supplying device 2A is similar to the power supplying device 2 mentioned in the first embodiment, and the same reference numbers are used in the drawings and the description to refer to the same parts. It should be noted that the power supplying device 2A shown in FIG. 8 further comprises a direct current (DC) to DC power converter 38, and the power converter 24 only includes a first electric power outputting terminal VA.

The DC to DC power converter 38 is electrically connected to the first electric power outputting terminal VA and the power manager 28 and includes a second electric power outputting terminal VB, a third electric power outputting terminal VC, and a standby electric power outputting terminal Vsb. The DC to DC power converter 38 receives a DC electric power outputted form the first electric power outputting terminal VA of the power converter 24, and outputs converted electric powers with power conversion to the electronic system PS from the second electric power outputting terminal VB, the third electric power outputting terminal VC, and the standby electric power outputting terminal Vsb. The switch component 30 is electrically connected to the first electric power outputting terminal VA, the second electric power outputting terminal VB, and the third electric power outputting terminal VC. The switch component 30 receives controlling signals outputted form the power manager 28 and conducts or cuts-of the electric powers outputted form the first electric power outputting terminal VA, the second electric power outputting terminal VB, and the third electric power outputting terminal VC and transmitting to the electronic system PS.

The first isolating switch 32 is electrically connected to the first electric power outputting terminal VA for isolated-transmitting signals corresponding to the electric power outputted form the first electric power outputting terminal VA to the controller 26. The function and relative description of other components of the power supplying device 2A are the same as that of first embodiment mentioned above and are not repeated here for brevity, and the power supplying device 2A can achieve the functions as the power supplying device 2 does.

Figure 9:
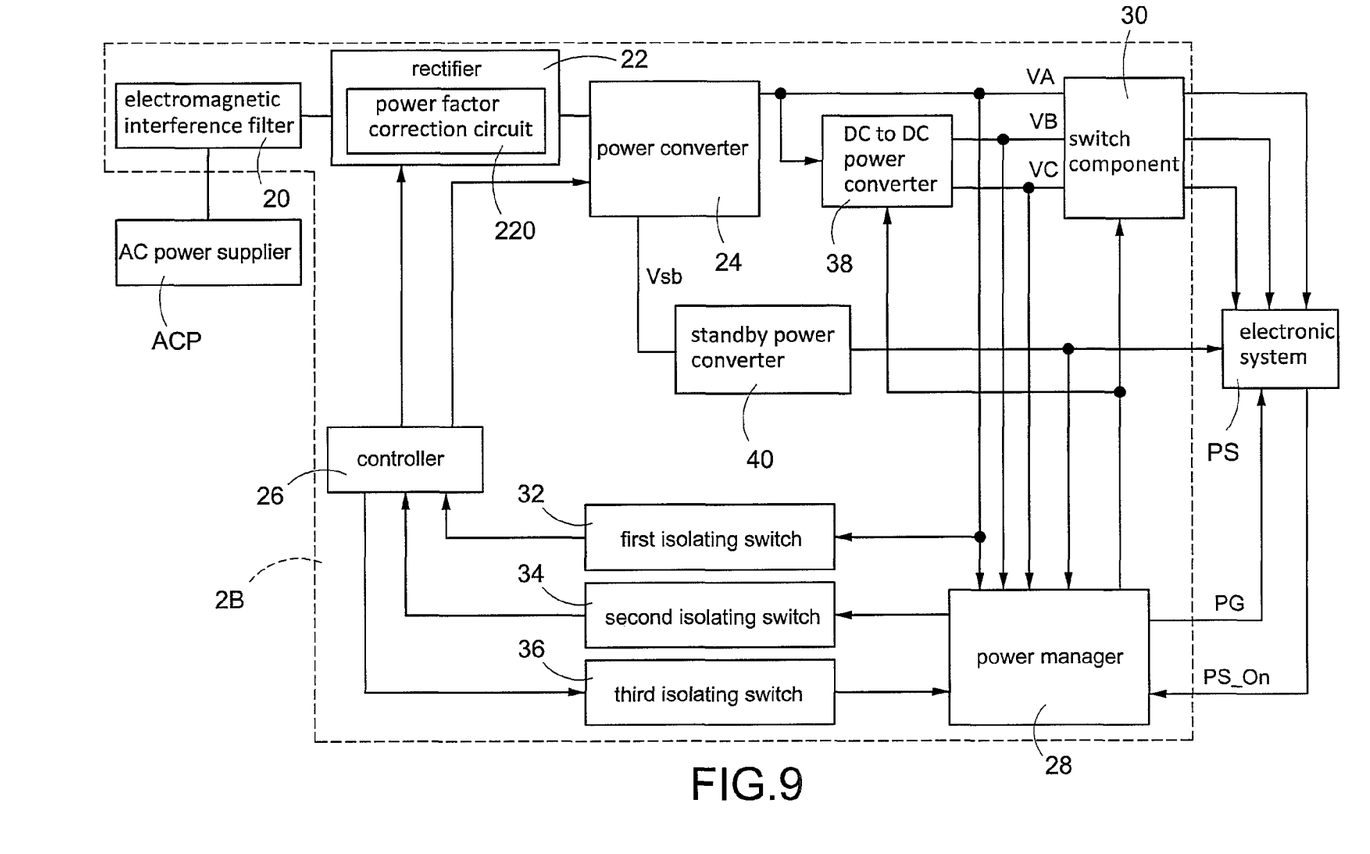
FIG. 9 is a circuit block diagram of a power supplying device according to a third embodiment of the present invention.

Reference is made to FIG. 9, which is a circuit block diagram of a power supplying device according to a third embodiment of the present invention. The power supplying device 2B is similar to the power supplying device 2 mentioned in the first embodiment, and the same reference numbers are used in the drawings and the description to refer to the same parts. It should be noted that the power supplying device 2B shown in FIG. 9 further comprises a direct current (DC) to DC power converter 38 and a standby power converter 40, and the power converter 24 includes a first electric power outputting terminal VA and a standby electric power outputting terminal Vsb.

The DC to DC power converter 38 is electrically connected to the first electric power outputting terminal VA and the power manager 28. The DC to DC power converter includes a second electric power outputting terminal VB and a third electric power outputting terminal VC. The DC to DC power converter receives a DC electric power outputted form the first electric power outputting terminal VA of the power converter 24, and outputs converted electric powers with power conversion to the electronic system PS from the second electric power outputting terminal VB and the third electric power outputting terminal VC. The switch component 30 is electrically connected to the first electric power outputting terminal VA, the second electric power outputting terminal VB, and the third electric power outputting terminal VC. The switch component 30 receives controlling signals outputted form the power manager 28 and conducts or cuts-of the electric powers outputted form the first electric power outputting terminal VA, the second electric power outputting terminal VB, and the third electric power outputting terminal VC and transmitting to the el The standby power converter 40 is electrically connected to the power converter 24, the power manager 28 and the electronic system PS. The standby power converter receives DC electric power outputted form the standby electric power outputting terminal Vsb of the power converter 24, and outputs converted electric power with power conversion to the electronic system PS. The first isolating switch is electrically connected to the first electric power outputting terminal VA for isolated-transmitting signals corresponding to the electric power outputted form the first electric power outputting terminal VA to the controller 26. The function and relative description of other components of the power supplying device 2B are the same as that of first embodiment mentioned above and are not repeated here for brevity, and the power supplying device 2B can achieve the functions as the power supplying device 2 does.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supplying device with low standby power consumption electrically connected to an alternative power (AC) supplier and an electronic system, the power supplying device with low standby power consumption receiving an AC electric power outputted by the AC supplier and outputting a converted electric power to the electronic system, the power supplying device with low standby power consumption comprising:
   a rectifier comprising a power factor correction circuit, the rectifier used for converting the AC electric power into a direct current (DC) electric power, the power factor correction circuit correcting the rectified DC electric power for decreasing the inputting current;
   a power converter electrically connected to the rectifier and comprising a first electric power outputting terminal and a standby electric power outputting terminal, the electronic system electrically connected to the standby electric power outputting terminal, the power converter receiving the DC electric power decreasing the inputting current and outputted from the rectifier;
   a controller electrically connected to the power converter;
   a power manager electrically connected to the controller and the electronic system; and a switch component electrically connected to the first electric power outputting terminal, the power manager, and the electronic system, the switch component conducting or cutting-off an electric power outputted from the first electric power outputting terminal according to controls of the power manager, wherein when the electronic system is operated in a standby mode, the power manager makes the switch component open, such that the electric power outputted from the first electric power outputting terminal does not transmit to the electronic system.

2. The power supplying device with low standby power consumption in claim 1, wherein the power converter comprises a second electric power outputting terminal electrically connected to the switch component, the switch component conducts or cuts-off electric powers outputted from the first electric power outputting terminal and the second electrical power outputting terminal according to controls of the power manager.

3. The power supplying device with low standby power consumption in claim 2, further comprising a first isolating switch electrically connected to the second electric power outputting terminal, the standby electric power outputting terminal, and the controller for isolated-transmitting signals corresponding to the electric powers outputted from the standby electric power outputting terminal and the second electric power outputting terminal to the controller.

4. The power supplying device with low standby power consumption in claim 3, further comprising:
a second isolating switch electrically connected to the power manager and the controller, wherein a protecting signal outputted from the power manager is transmitted to the controller via the second isolating switch; and
a third isolating switch electrically connected to the power manager and the controller, wherein a controlling signal outputted from the controller is transmitted to the power manager via the third isolating switch.

5. The power supplying device with low standby power consumption in claim 4, further comprising an electromagnetic interference filter electrically connected to the AC power supplier and the rectifier.

6. The power supplying device with low standby power consumption in claim 5, wherein the power converter is a direct current (DC) to DC power converter.

7. The power supplying device with low standby power consumption in claim 6, wherein the power converter is an LLC resonant power converter, a dual forward power converter or a single forward power converter.

8. The power supplying device with low standby power consumption in claim 1, further comprising:
a standby power converter electrically connected to the standby electric power outputting terminal of the power converter; and
a DC to DC power converter electrically connected to the first electric power outputting terminal, the DC to DC power converter comprising a second electric power outputting terminal and a third electric power outputting terminal, the second electric power outputting terminal and the third electric power outputting terminal electrically connected to the switch component, the switch component conducting or cutting-off electric powers outputting from the first electric power outputting terminal, the second electric power outputting terminal, and the third electric power outputting terminal according to controls of the power manager.

9. The power supplying device with low standby power consumption in claim 8, further comprising a first isolating switch electrically connected to the first electric power outputting terminal and the controller for isolated-transmitting signals corresponding to the electric power outputted from the first electric power outputting terminal to the controller.

10. The power supplying device with low standby power consumption in claim 9, further comprising:
a second isolating switch electrically connected to the power manager and the controller, wherein a protecting signal outputted from the power manager is transmitted to the controller via the second isolating switch; and
a third isolating switch electrically connected to the power manager and the controller, wherein a controlling signal outputted from the controller is transmitted to the power manager via the third isolating switch.

11. The power supplying device with low standby power consumption in claim 10, further comprising an electromagnetic interference filter electrically connected to the AC power supplier and the rectifier.

12. The power supplying device with low standby power consumption in claim 11, wherein the power converter is a DC to DC converter.

13. The power supplying device with low standby power consumption in claim 12, wherein the power converter is an LLC resonant power converter, a dual forward power converter or single forward power converter.

14. A power supplying device with low standby power consumption electrically connected to an alternative power (AC) supplier and an electronic system, the power supplying device with low standby power consumption receiving an AC electric power outputted by the AC supplier and outputting a converted electric power to the electronic system, the power supplying device with low standby power consumption comprising:
a rectifier comprising a power factor correction circuit, the rectifier used for converting the AC electric power into a direct current (DC) electric power, the power factor correction circuit correcting the rectified DC electric power for decreasing the inputting current;
a power converter electrically connected to the rectifier and comprising a first electric power outputting terminal, the power converter receiving the DC electric power decreasing the inputting current and outputted from the rectifier;
a DC to DC power converter electrically connected to the first electric power outputting terminal and comprising a second electric power outputting terminal, a third electric power outputting terminal, and a standby electric power outputting terminal, the standby electric power outputting terminal electrically connected to the electronic system;
a controller electrically connected to the power converter;
a power manager electrically connected to the controller, the DC to DC power converter, and the electronic system; and
a switch component electrically connected to the first electric power outputting terminal, the second electric power outputting terminal, the third electric power outputting terminal the power manager, and the electronic system, the switch component conducting or cutting-off electric powers outputted from the first electric power outputting terminal, the second electric power outputting terminal and the third electric power outputting terminal according to controls of the power manager, wherein when the electronic system is operated in a standby mode, the power manager makes the switch component open, such that the electric powers outputted from the first electric power outputting terminal, the second electric power outputting terminal, and the third electric power outputting terminal do not transmit to the electronic system.

15. The power supplying device with low standby power consumption in claim 14, further comprising:
   a first isolating switch electrically connected to the first electric power outputting terminal and the controller for isolated-transmitting signal corresponding to the electric power outputted from the first electric power outputting terminal to the controller;
   a second isolating switch electrically connected to the power manager and the controller, wherein a protecting signal outputted from the power manager is transmitted to the controller via the second isolating switch; and
   a third isolating switch electrically connected to the power manager and the controller, wherein a controlling signal outputted from the controller is transmitted to the power manager.

16. The power supplying device with low standby power consumption in claim 15, further comprising an electromagnetic interference filter electrically to the AC power supplier and the rectifier.

17. The power supplying device with low standby power consumption in claim 16, wherein the power converter is a DC to DC power converter.

18. The power supplying device with low standby power consumption in claim 17, wherein the power converter is an LLC resonant power converter, a dual forward power converter or a single forward power converter.

* * * * *